May 21, 1968     LA ROY B. PASSER     3,384,342
REPLACEMENT FAUCET WASHER
Filed Oct. 23, 1965
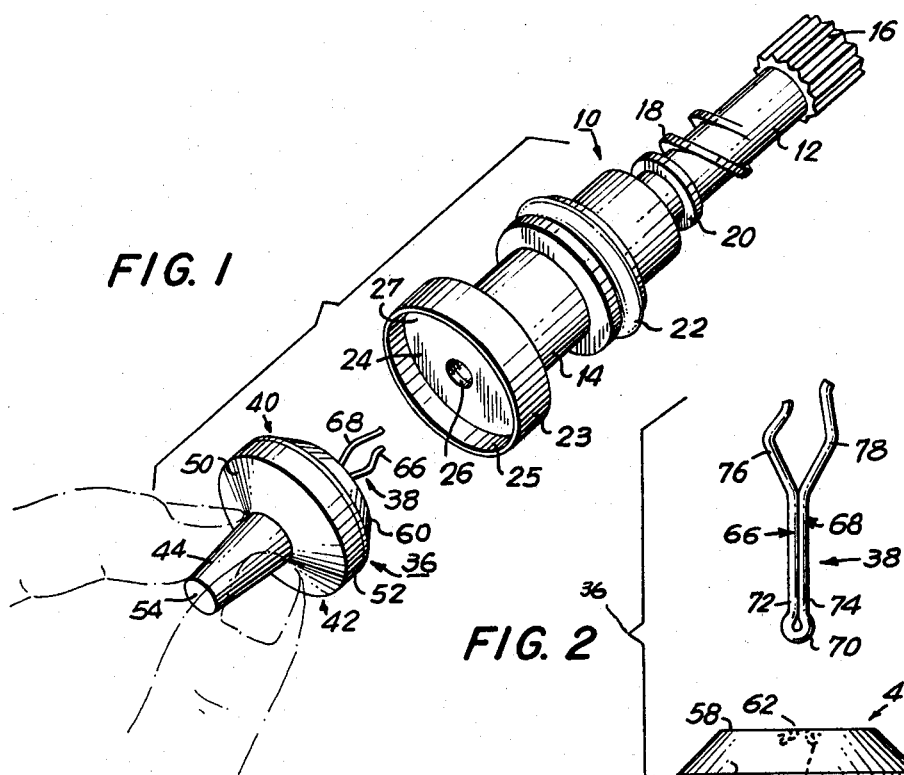
FIG. 1
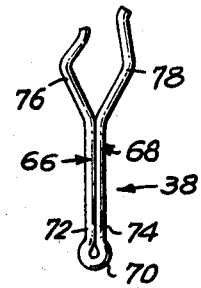
FIG. 2
FIG. 3
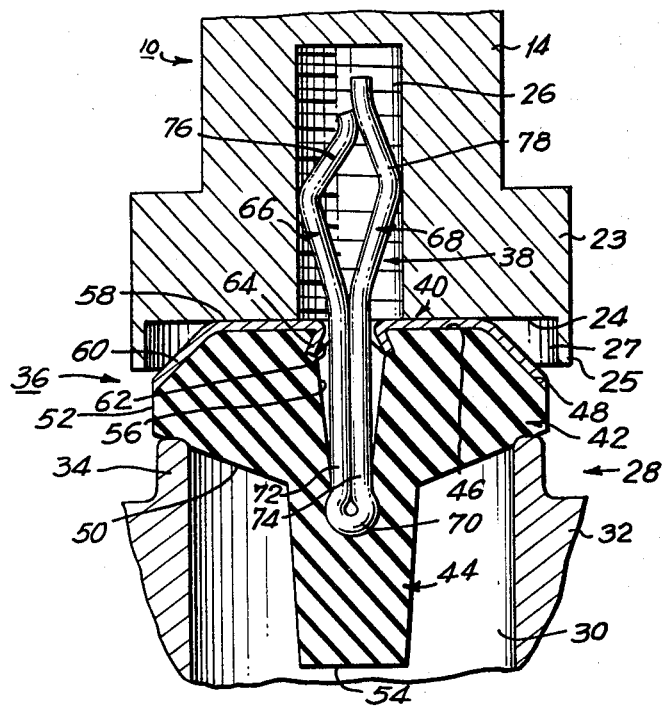
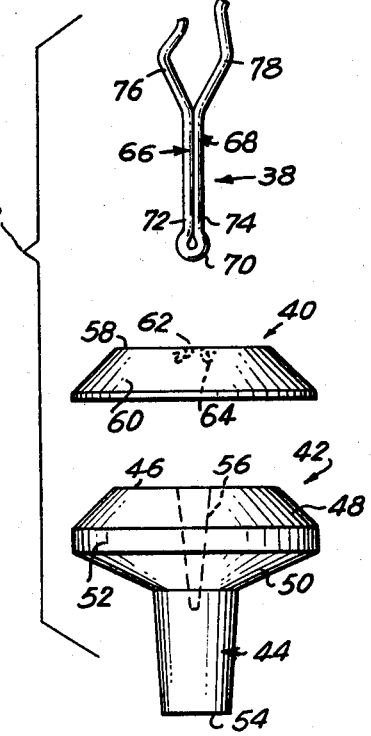
FIG. 4
INVENTOR.
LaROY B. PASSER
BY
*Kirschstein, Kirschstein & Ottinger*
ATTORNEYS

United States Patent Office 3,384,342
Patented May 21, 1968

3,384,342
REPLACEMENT FAUCET WASHER
La Roy B. Passer, Port Jefferson, N.Y., assignor to Passer Fastener Corporation, Patchogue, N.Y., a corporation of New York
Filed Oct. 23, 1965, Ser. No. 502,922
14 Claims. (Cl. 251—357)

ABSTRACT OF THE DISCLOSURE

A replacement faucet washer comprising a circular rubber-like washer body with a dependent stem, the top surface of the body being flat at the center and being downwardly flaring frustoconical around the flat center, the under surface of the body being upwardly flaring and frustoconical, a stiff cap fitting over the upper surface of the washer body, the cap being shaped to match the flat center and flaring frustoconical portion of the washer body, the cap having an opening through which a spring clip extends. The upwardly extending part of the spring clip constitutes a pair of arms with knuckles for frictionally engaging a threaded bore in the lower end of a faucet stem. The tips of the arms are longitudinally offset and the tip of one arm is transversely aligned with the knuckle of the other arm.

---

This invention relates to a replacement faucet washer.

It is the primary object of my invention to provide a washer especially adapted to replace original and previously substituted washers when the latter are so worn as to be ineffective, a few sizes of my new washer being capable of replacing washers for many sizes of hot and cold household faucets.

It is another object of my invention to provide a replacement faucet washer of the character described which can be connected to the stem of an emplaced faucet in an extremely easy manner, in a minimum of time and without the use of hand tools, and which eliminates the screw connection usually employed between washers and faucet stems.

It is another object of my invention to provide a replacement faucet washer of the character described which enables a person shutting off the flow of water from the faucet, thereby locating the washer against the valve seat, to do so with a minimum of effort.

It is another object of my invention to provide a replacement faucet washer of the character described which can be installed without altering the stem of the faucet as is usually done in the conventional replacement of washers with previously known "no-rotate" washers, a task which homeowners find annoying.

It is another object of my invention to provide a replacement faucet washer of the character described which includes a dependent stem that centers the washer with respect to the annular valve seat within the faucet so that the washer is retained in its proper location when the faucet is opened and closed.

It is another object of my invention to provide a replacement faucet washer of the character described which includes a rigid washer cap that distributes the force from the faucet stem over the entire upper face of the washer body.

It is another object of my invention to provide a replacement faucet washer of the character described which includes a rigid washer cap that overlies the upper face of the body of the washer and which is so configured that when axial pressure is exerted on the washer body, the cap will restrain the washer from expanding or bulging outwardly and consequently becoming disfigured.

It is another object of my invention to provide a replacement faucet washer of the character described which is so constructed that the washer is free to rotate with respect to the faucet stem whereby when the washer just engages the annular valve seat, further tightening rotation of the stem will principally exert only an axial force on the washer and not a strong rotative force which would tend to turn the washer and abrade the same against the valve seat.

It is another object of my invention to provide a replacement faucet washer of the character described which is simple in construction, long in life under conditions of use, lends itself to manufacture through mass production techniques and is marketable at a relatively low price.

Other objects of my invnetion in part will be obvious and in part will become apparent to the reader in the following description.

My invention accordingly consists in the features of construction, combinations of elements and arrangements of parts which will be exemplified in the replacement faucet washer hereinafter described and of which the scope of application will be indicated in the appended claims.

In the accompanying drawings in which is shown one of the various possible embodiments of my invention, FIG. 1 is a perspective view of a replacement faucet washer incorporating my invention and held preparatory to being inserted in the stem of a faucet;

FIG. 2 is an enlarged exploded side view of my replacement washer;

FIG. 3 is an enlarged axial cross-sectional view of my replacement washer within a faucet, between the valve seat and the faucet stem; and FIG. 4 is an enlarged partially broken away perspective view of the interior of the washer cap and illustrating the ring of teeth therein.

In general, and in accordance with the teaching of my invention, I provide a replacement faucet washer including four components, to wit, a spring clip, a washer body, a washer cap and a pilot stem depending from and in one piece with the washer body. The cap is of frusto-conical configuration and covers the upper face of the washer body. The cap is formed from sheet metal and the washer body including the stem is formed from any natural or synthetic rubber. The spring clip has its bight located within the washer body and extends vertically up and centrally through the cap, and is adapted to frictionally engage the threaded bore conventionally provided in the bottom of the faucet stem.

Referring now in detail to the drawings, the reference numeral 10 denotes a faucet stem of the type which is standard for use in hot and cold water faucets in homes. The stem 10 is generally cylindrical and elongated and includes an upper portion 12 of relatively smaller diameter and a lower portion 14 of relatively larger diameter. The head of the stem 10 is longitudinally fluted as at 16 and is accordingly adapted to engage the matching bore of a faucet handle (not shown). The upper portion 12 of the stem includes a coarse male thread 18 which mates with a female thread (not shown) within the interior of the faucet housing. The thread 18 terminates in a lower stop ring 20. The lower portion 14 of the stem has a flange which is configured to carry an encircling O-ring 22 which which forms a rotary and axially slidable seal between the stem and the faucet housing. The lower end 23 of the faucet stem is enlarged and is provided with a flat face 24 and a central tapped bore 26 extending axially of the stem. The circular stem end 23 has extending from it a circular annular dependent peripheral flange, i.e. skirt 25. The stem end face 24 and the skirt 25 define a shallow cylindrical cavity 27 in which the original washer or a substitute washer were previously seated and held by a screw (not shown) that was threadedly engaged in the bore 26.

FIG. 3 illustrates the lower portion of the faucet stem as well as a portion of valve seat 28 standard in household faucets located immediately below and in alignment with the stem. The valve seat 28 circumscribes the upper end of a water passageway 30 which is defined by the housing 32 of the faucet. The valve seat 28 comprises the end of an annular wall 34 which is the upper termination of the passageway 30. The outside diameter of the valve seat 28 is less than the inside diameter of the annular flange 25.

The replacement faucet washer which embodies my invention is designated by the reference numeral 36 and includes four components, to wit, a resilient spring clip 38, a washer cap 40, a washer body 42 and a pilot stem 44 in one piece with the washer body 42. The washer body 42 and the pilot stem 44 are formed from any natural or synthetic water-impervious elastomeric material, e.g. natural or synthetic rubber, of the type which is conventionally used for washers. Preferably, said material is Neoprene.

The body 42 of the washer has a flat circular upper end wall 46, said wall being in a plane perpendicular to the axis of symmetry of the washer. The body further includes an upper frusto-conical downwardly diverging wall 48 and a lower frusto-conical upwardly diverging wall 50, the upper and lower walls 48, 50 being of the same maximum diameter and being coaxial. The upper wall and lower wall are separated by a narrow cylindrical wall 52. The upper end wall 46 and upper conical wall 48 constitute the upper face of the washer body. The maximum diameter of the washer body 42 is somewhat, e.g. ⅛ inch, larger than the maximum diameter of the largest valve seat 28 with which it will be employed so that when said washer is forced against the seat, the washer body will overlie the rim of the valve seat and a tight seal will be assured. Said maximum diameter of the washer body is approximately ½ inch for one widely used size of the washer 36.

The pilot stem 44 is, as has been mentioned, in one piece with the washer body 42 and depends downwardly therefrom and is centered on the washer body. The stem is conical and slightly tapered in a downward direction. The axis of symmetry of the stem is coincident with the axis of symmetry of the washer 36. The stem terminates in a flat lower end wall 54 which lies in a plane parallel to the upper end wall 46. The length of the stem is somewhat longer than the axial length of the washer body, typically being about ¼ inch. The average diameter of the stem 44 is preferably somewhat less than one half the diameter of the passageway 30. The washer body 42 as well as the stem 44 are solid except for a conical downwardly converging slender well 56 which runs from the upper end wall 46 centrally of the washer body 42 and terminates at the upper portion of the pilot stem 44.

The cap 40 is formed from any rigid self-form-maintaining material such as sheet metal. Stainless steel is preferably used to resist the effects of water corrosion and to assure long life. The cap 40 is configured to cover and lie flat against and over the upper face of the washer body and accordingly includes a flat circular upper wall 58 which is in face-to-face contact with the upper end wall 46 of the washer body and a frusto-conical downwardly diverging upper wall 60 which is in face-to-face contact with and of the same diameter and slope angle as the upper wall 48 of the washer body. A central through aperture 62 is formed in the upper wall 58 of the cap 40 and is in alignment with the conical well 56 in the washer body. The aperture 62 is defined by a pendant annular ring of downwardly pointing teeth 64 which bite into the wall of the washer body 42 surrounding the upper end of the conical well 56 (see FIG. 3).

The spring clip 38 includes two upwardly extending arms 66, 68 connected by a bight 70. Each of the arms has a lower section, respectively, 72, 74 which are coextensive and in contact along their lengths. The arms further include "knuckles" or upper sections, respectively, 76, 78 which extend from the lower sections first outwardly away from one another and then again at their tips towards one another. The tips do not meet when the spring clip is not under pressure (see FIGS. 1 and 2). The distance between the outer sides of the upper sections 76, 78 of the arms of the spring clip at their maximum laterally spaced relaxed positions shown in FIGS. 1 and 2 is greater than the diameter of the bore 26. The spring clip is proportioned so that the lower sections 72, 74 of the arms have their major portions located within the conical well 56 in the washer body. The bight 70 forces the bottom pointed end of the conical well to expand and the body of the washer around the bight retains the bight, and therefore the spring clip, in its proper location. The bases of the teeth 64 surround the upper portion of the lower sections 72, 74 and frictionally engage the spring clip at this point. This frictional engagement aids in retaining the clip in place and also holds the cap 40 in place over the upper face of the washer body. The bight 70 is too large to freely pass outwardly through the aperture 62 defined by the ring of teeth 64 although it can be forced through the same.

The end of one of the arms 68 protrudes vertically beyond the end of the other arm 66. This permits ease of entry of the spring clip into bores 26 of various-sized diameters. It is especially valuable when a spring clip is urged into a bore having a diameter which is substantially the same as the lateral distance between the tips of the arms. If the arm tips were not longitudinally offset, said arms would have to be pressed together to permit entry. However, with my spring clip with its longitudinally displaced tips, first the leading tip can be pushed into the bore and then the second tip worked in, the same being accomplished quite easily especially as compared to a spring clip with aligned arm tips.

Additionally the tip of the shorter arm is aligned with a widened portion of the knuckle of the longer arm thereby permitting the knuckles to be squeezed closer together than if the tip of the shorter arm were aligned with a non-inclined portion of the longer arm so that a single clip so formed can accommodate itself to a greater range of diameters of bores 26.

In order to substitute my new replacement washer for a worn washer, first the faucet is disassembled to remove the faucet stem 10. Any washer therein and any screw threaded in the tapped bore 26 are discarded.

It will be appreciated that heretofore the replacement with washers of the same type as that with which a faucet was originally equipped was a considerable nuisance. A screw held the washer to the stem and often the screw in the bore became frozen and the head of the screw was mutilated or broken during removal. A new screw of the correct diameter and pitch was often difficult to purchase. Such screws were usually made of brass to avoid the corrosive effects of water and after a few replacements were made the screw became so worn that it was no longer useful. Frequently parts of the skirt 25 broke off, making the stem unusable for the old type washer.

My new faucet washer 36 entirely eliminates the need for a screw. After the old screw and washer are removed, my new washer can quickly and easily be inserted into place simply by holding the stem 44 of the washer and thrusting the spring clip into the bore 26 in the manner illustrated in FIG. 1. As has been previously explained, the spring clip is adapted to frictionally engage bores of a wide variety of diameters so that a few sizes of my washers can replace many sizes of previous washers and screws.

After the faucet is again reassembled, my replacement washer functions in a new and improved manner. The spring clip, the lower portion of which is attached to the washer body, exerts lateral radially outward pressure at diametrically opposed locations of the bore wall 26. Thus, the spring clip, while retaining the washer in its proper location against the end of the faucet stem, permits relative rotation of the washer with respect to the stem, since the upper sections 76, 78 can rotate within the bore 26 while slipping over the threads of said bore. This freedom of rotation is especially important when the washer body is first lightly engaged against the valve seat and then put under greater pressure to close the valve seat. If rotation of the washer was required due to a rigid connection to the valve stem, the under surface of the washer body would be forced to rotate against the upper surface of the wall 34 of the valve seat. This upper wall is often rough and burred especially after considerable use and a few replacements and hence rotation would cause considerable torsion to be placed on the washer body which would engender undue abrasion, stretching and tearing of the washer elastomeric material which would soon end the life of said washer. With the non-rotative feature of my washer, after initial light frictional contact is made between the under surface of the washer body and the valve seat, further rotation and downward movement of the valve stem exert only axially directed downward pressure on the washer body so that the washer body seats firmly against the annular wall 34 all without the application of destructive torsional forces.

As this downward pressure is applied, the force of the faucet stem is applied directly against the top wall 58 of the cap and the cap, being made of a rigid material, spreads said force over the entire upper surface of the washer body. A good distribution of the stem-applied force is thus achieved.

Other types of replacement faucet washers previously proposed in the art required the removal of the annular peripheral skirt 25 dependent from the faucet stem in order to accommodate and provide sufficient space for such proposed washers which did not have conical upper faces. It will be appreciated that the removal of this skirt is difficult, bothersome and time-consuming for homeowners. My new replacement faucet washer provides for a washer body which, while having a diameter sufficiently large to overlie the valve seat 28, yet is so configured to be clear of the skirt so that the same need not be removed. For this reason, my washer has the upper conical downwardly diverging wall 48 which runs from the upper face of the washer body downwardly and outwardly, clear of the skirt 25, to a diameter somewhat larger than the interior diameter of the wall 34 of the valve seat 28. It should be appreciated that whether the outside diameter of the washer body 42 is greater, the same as or less than the diameter of the skirt 25, yet the cap 40 and the washer body 42 are configured, as described, to clear such skirt. Again, this permits a few sizes of my washer to fit stems of various sizes.

A very important feature of my faucet washer is the restraining and constrictive force applied to the washer body by the conical wall 60 of the cap 40 when the faucet is closed and the washer body is forced against the valve seat. Such forces are applied in a direction generally downwardly perpendicular to the top wall 58 of the cap and, as well, inwardly perpendicular to the upper conical wall 60 of the cap. I have found that heretofore when washers were used which had no constrictive effect, the force applied to them when they were pressed between any two surfaces would cause undue radially outward expansion and a correspondingly shorter life.

In my washer, it will be appreciated that a narrow small area of high intensity pressure is applied to the under surface 50 of the body of the washer by the contacting end of the annular wall 34. I have found that by locating portions of the cap both on the upward horizontal face of the washer as well as around the upwardly facing conical sides of the washer, with portions of said cap overlying and preferably extending to a diameter somewhat greater than the valve seat, undue expansion of the washer material is curtailed and consequently constant and even wear is applied to the various portions of the washer insuring the maximum possible life. In such cases where the cap 40 is of greater diameter than the dependent stem flange 25, if the washer should shift out of alignment with the axis of the stem, contact between the rim of the flange 25 and the cap 40 and especially the conical wall 60 thereof quickly realigns the washer prior to closing of the faucet.

The stem 44 of the washer serves as a convenient handle by which the washer may be grasped as it is inserted into engagement with the faucet stem 10 (see FIG. 1). Further, the mass of the stem adds to the mass of the body of the washer and the top of the stem grips the bight 70 of the spring clip. However, the primary function of the stem is to pilot the washer into its proper position as the washer is lowered from a position in which the faucet is open to a position in which the faucet is closed and the washer body seals the valve seat against the passage of water. It will be apparent that if the washer becomes disaligned as the washer is lowered along with the faucet stem, the stem 44 will enter some portion of the passageway 30 and further movement will tend to align the washer within the faucet.

It thus will be seen that I have provided a replacement washer which achieves the several objects of my invention and which is well adapted to meet the conditions of practical use.

As various possible embodiments might be made of the above invention, and as various changes might be made in the embodiment set forth, it is to be understood that all matter herein described or shown in the accompanying drawings is to be interpreted as illustrative and not in a limiting sense.

Having thus described my invention, I claim as new and useful, and desire to secure by Letters Patent:

1. A replacement faucet washer for use with a faucet including a faucet stem having a lower circular peripheral skirt circumscribing a threaded bore in its lower end and a valve seat through which water passes, said washer comprising a circular washer body of elastomeric water-impervious material, an elongated stem in one piece with the body and dependent centrally therefrom, a cap or stiff, self-form-maintaining material having a downwardly flaring configuration, said cap fitting over the upper face of the washer body, and a resilient spring clip extending upwardly from the washer body through an opening in the cap, said spring clip having upper portions transversely spaced apart a distance greater than the diameter of the bore of the stem and dimensioned and constructed to be inserted into so as to engage the threaded bore by laterally-directed friction whereby to permit rotation of the washer relative to the faucet stem, the cap having an upper central portion dimensioned and configured to be seated against the lower end of the faucet stem with its flaring portion extending downwardly clear of the skirt of the faucet stem, the under surface of the washer body being dimensioned and configured to sealingly engage the valve seat so as to prevent passage of water when the faucet is closed, the cap distributing the force exerted by the faucet stem over the upper face of the washer body and the flaring configuration of the cap constricting the washer body against undue expansion when it engages the valve seat, the dependent stem of the washer protruding into the valve seat and piloting the washer into proper location as it engages said valve seat, the dependent stem further constituting a handle for grasping the washer when the spring clip is inserted into the threaded bore in the valve stem.

2. A replacement faucet washer as set forth in claim 1 wherein the cap and the upper face of the washer body are of matching configuration and are in face-to-face relation.

3. A replacement faucet washer as set forth in claim 2 wherein the flaring configuration of the cap overlies the valve seat when the washer sealingly engages said seat.

4. A replacement faucet washer as set forth in claim 2 wherein the cap and the upper face of the washer body are of frusto-conical configuration.

5. A replacement faucet washer as set forth in claim 2 wherein the lower end of the spring clip is retained in a conical opening in the washer body.

6. A replacement faucet washer as set forth in claim 5 wherein the spring clip is frictionally engaged by the cap around the opening through which the spring clip passes.

7. A replacement faucet washer as set forth in claim 6 wherein the cap includes a ring of teeth circumscribing the opening and protruding into the washer body.

8. A replacement faucet washer as set forth in claim 5 wherein the upper portions of the spring clip constitute arms the tips of which are longitudinally offset.

9. A replacement faucet washer as set forth in claim 3 wherein the under surface of the washer body around the stem is upwardly flaring.

10. A replacement faucet washer as set forth in claim 9 wherein the under surface of the washer body around the stem is conical.

11. A replacement faucet washer as set forth in claim 3 wherein the lower end of the dependent stem is flat and the central portion of the cap is flat.

12. A replacement faucet washer for use with a faucet including a faucet stem having a lower circular peripheral skirt and a valve seat through which water passes, said washer comprising a circular washer body of elastomeric water-impervious material, an elongated stem in one piece with the body and dependent centrally therefrom and a cap of stiff, self-form-maintaining material having a downwardly flaring configuration, said cap fitting over the upper face of the washer body, the cap having an upper central portion dimensioned and configured to be seated against the lower end of the faucet stem with its flaring portion extending downwardly clear of the skirt of the faucet stem, the upper surface of the washer body having a frustoconical portion matching the downwardly flaring portion of the cap and in face-to-face contact therewith, the under surface of the washer body being dimensioned and configured to sealingly engage the valve seat so as to prevent passage of water when the faucet is closed, the cap distributing the force exerted by the faucet stem over the upper face of the washer body, and the flaring configuration of the cap cooperating with the matching frusto-conical portion of the washer body to constrict the washer body against undue expansion when it engages the valve seat, the dependent stem of the washer protruding into the valve seat and piloting the washer into proper location as it engages said valve seat.

13. A replacement faucet washer for use with a faucet including a faucet stem having a threaded bore in its lower end and a valve seat through which water passes, said washer including a washer body of elastomeric water-impervious material dimensioned and configured to close against the valve seat and a resilient spring clip attached to and extending upwardly from the washer body, said spring clip including two upwardly extending arms each including a knuckle, said knuckles being transversely spaced apart a distance greater than the diameter of the bore, each arm terminating in a tip, the tips being longitudinally offset from one another, the arms being dimensioned and constructed to be inserted into so as to engage the threaded bore by laterally-directed friction whereby to permit rotation of the washer relative to the faucet stem and to inhibit removal of the arms from the bore.

14. A replacement faucet washer as set forth in claim 13 wherein the tip of one arm is transversely aligned with the knuckle of the other arm.

References Cited

UNITED STATES PATENTS

| | | | |
|---|---|---|---|
| 1,931,386 | 10/1933 | Hughes | 251—357 XR |
| 2,026,074 | 12/1935 | Jacobs | 251—357 XR |
| 2,077,766 | 4/1937 | Mead | 251—357 XR |
| 2,194,961 | 3/1940 | Walker | 251—357 XR |
| 2,429,783 | 10/1947 | Weiss | 251—357 XR |
| 2,717,757 | 9/1955 | Bowlzer | 251—357 XR |
| 2,888,236 | 5/1959 | Hare | 251—357 XR |
| 2,920,861 | 1/1960 | Hartmann | 251—357 |
| 2,952,439 | 9/1960 | Koons | 251—357 |
| 3,053,502 | 9/1962 | Brooks | 251—357 |
| 3,137,476 | 6/1964 | Rotheraine et al. | 251—357 |

FOREIGN PATENTS

| | | |
|---|---|---|
| 588,831 | 6/1947 | Great Britain. |

M. CARY NELSON, *Primary Examiner.*

S. SCOTT, *Assistant Examiner.*